United States Patent
Chung et al.

(10) Patent No.: US 11,921,874 B2
(45) Date of Patent: Mar. 5, 2024

(54) METHOD AND SYSTEM FOR PROTECTING FILE USING CLASS DISTRIBUTION AND SEQUENTIAL MEMORY LOADING

(71) Applicant: LINE Plus Corporation, Seongnam-si (KR)

(72) Inventors: Sang Min Chung, Seongnam-si (KR); Seol hwa Han, Seongnam-si (KR); SangHun Jeon, Seongnam-si (KR)

(73) Assignee: LINE Plus Corporation, Gyeonggi-do (KR)

( * ) Notice: Subject to any disclaimer, the term of this patent is extended or adjusted under 35 U.S.C. 154(b) by 350 days.

(21) Appl. No.: 17/333,575

(22) Filed: May 28, 2021

(65) Prior Publication Data

US 2021/0390198 A1    Dec. 16, 2021

(30) Foreign Application Priority Data

Jun. 11, 2020   (KR) .................. 10-2020-0071105

(51) Int. Cl.
*G06F 21/62*    (2013.01)
*G06F 8/61*    (2018.01)

(52) U.S. Cl.
CPC ............ *G06F 21/6218* (2013.01); *G06F 8/61* (2013.01)

(58) Field of Classification Search
CPC .. G06F 21/6218; G06F 21/121; G06F 21/629; G06F 21/125; G06F 21/565; G06F 8/61; G06F 8/72; G06F 9/445
See application file for complete search history.

(56) References Cited

U.S. PATENT DOCUMENTS

| | | | | |
|---|---|---|---|---|
| 8,984,299 B1 * | 3/2015 | Yi | ............................ | G06F 21/14 |
| | | | | 713/189 |
| 9,230,123 B2 * | 1/2016 | Yi | ............................ | G06F 21/60 |
| 9,396,313 B2 * | 7/2016 | Yi | .......................... | G06F 21/125 |
| 9,852,289 B1 * | 12/2017 | Mann | .................. | G06F 11/1451 |
| 10,205,732 B2 * | 2/2019 | Ahn | ........................ | G06F 21/54 |
| 2003/0163718 A1 * | 8/2003 | Johnson | .................. | G06F 21/79 |
| | | | | 713/193 |
| 2008/0208560 A1 * | 8/2008 | Johnson | ................. | H04L 9/002 |
| | | | | 703/22 |

FOREIGN PATENT DOCUMENTS

KR       101328012 B1    11/2013

* cited by examiner

*Primary Examiner* — Han Yang
(74) *Attorney, Agent, or Firm* — Harness, Dickey & Pierce, P.L.C.

(57) ABSTRACT

A file protection method of a computer apparatus including a processor, the method including extracting classes from an executable file of a package file, classifying the classes into class groups, adding a loading code to a first class group among the class groups, the loading code configured to cause sequential loading of the class groups to a memory in a random loading order in response to execution of the package file, adding an integrity code to a second class group among the class groups, the integrity code configured to verify an integrity of a corresponding class group among the class groups or a previous class group among the class groups, the previous class group including the loading code configured to cause the corresponding class group to load, and regenerating the package file using the class groups after the adding the loading code and the adding the integrity code.

19 Claims, 6 Drawing Sheets

METHOD AND SYSTEM FOR PROTECTING FILE USING CLASS DISTRIBUTION AND SEQUENTIAL MEMORY LOADING

CROSS-REFERENCE TO RELATED APPLICATION(S)

This U.S. non-provisional application claims the benefit of priority under 35 U.S.C. § 119 to Korean Patent Application No. 10-2020-0071105, filed Jun. 11, 2020, the entire contents of which are incorporated herein by reference in their entirety.

TECHNICAL FIELD

Some example embodiments relate to a method and system for protecting a file using a class distribution and sequential memory loading.

BACKGROUND

When an arbitrary program, for example, a binary or a source code, is given, analyzing and understanding an operation method of the corresponding program is called "reverse engineering." A company that sells a finished product, for example, a binary, may desire the finished product to be difficult to reversely engineer since the product contains technology of the corresponding company. As an example of making reverse engineering difficult, various obfuscation techniques may be incorporated in a code of a program. For example, obfuscation may be performed by adding insignificant logic or codes at a source code level of the program to a source code, or by encrypting or encoding data, such as a character string included in the source code. As another example, obfuscation may be performed by modifying a format of an executable file or an assembly code to make it difficult to interpret a code region for the executable file. An application code obfuscation apparatus may be used for applying obfuscation by modifying a code structure that constitutes an application that operates in a JAVA virtual machine. That is, obfuscation is performed by modifying an assembly code of a built application.

Here, classes (e.g., a JAVA class of Android application package (APK) in an Android operating system (OS) environment) to be protected in a package file may be generated in the form of a single executable file (e.g., a dex file), at least a portion (e.g. for example, classes to be protected) of a single executable file may be encrypted or obfuscated in an unrecognizable form, and a protection code capable of restoring and protecting the encrypted at least a portion of the executable file may be added and stored. Subsequently, the protection code may be executed at an execution point in time of the executable file, and a code of the encrypted at least a portion of the executable file may be restored and stored in a temporary file and loaded to a memory. In this manner, classes present in the package file may be protected.

However, the protected executable file is present in a restored state at a point in time. Therefore, in the case of removing and then replacing the exposed protection code by extracting classes in a restored state, the protection code for the executable file may be easily bypassed, which may make only source classes operate.

SUMMARY

Some example embodiments provide a file protection method and system that may generate a plurality of class groups by distributing classes of a source executable file included in a package file, and may allow at least one group among the plurality of class groups to verify integrity of a current class group and/or a class group having called the current class group while the plurality of class groups is sequentially loaded to a memory in random order at a point in time at which execution of the source executable file is requested, thereby preventing bypass of a protection code for the executable file or reducing the occurrence thereof.

According to an aspect of some example embodiments, there is provided a file protection method of a computer apparatus including at least one processor, the file protection method including extracting, by the at least one processor, a plurality of classes from an executable file of a package file, classifying, by the at least one processor, the plurality of classes into a plurality of class groups, adding, by the at least one processor, a loading code to at least one first class group among the plurality of class groups, the loading code configured to cause sequential loading of the plurality of class groups to a memory in a random loading order in response to execution of the package file, adding, by the at least one processor, an integrity code to at least one second class group among the plurality of class groups, the integrity code configured to verify an integrity of at least one of a corresponding class group among the plurality of class groups or a previous class group among the plurality of class groups, the previous class group including the loading code configured to cause the corresponding class group to load, and regenerating, by the at least one processor, the package file using the plurality of class groups after the adding the loading code and the adding the integrity cod.

The classifying may include designating the plurality of classes as one or more protected classes and one or more non-protected classes, and classifying each of the one or more protected classes into a protected class group among the plurality of class groups, and classifying each of the one or more non-protected classes into a non-protected class group among the plurality of class groups.

The classifying may include further classifying the protected class group into at least two protected class groups.

The classifying may include encrypting the one or more protected classes or the protected class group.

The adding the loading code may add the loading code to a static initialization function of the at least one first class group.

The adding the integrity code may include adding an integrity verification code to the at least one second class group, the integrity verification code configured to indicate whether an integrity detection code included in another class group has been modified.

The integrity detection code may include at least one of a function of which bytecode is modified to be abnormally terminated, a function of which bytecode is modified to use a registry size beyond an available range, or a separate class that is not called.

The adding of the integrity code may include controlling a computer apparatus to access integrity information corresponding to the at least one second class group on an external system, and add an integrity verification code to the at least one second class group based on the integrity information, the other computer apparatus configured to install and execute the package file.

The adding of the integrity code may include adding a protection code to the at least one second class group.

The protection code may include a code for performing at least one of an operation of an anti-disassembler, an operation of an anti-decompiler, or an operation of an anti-debugger, and the adding the protection code may add the protection code to a protected class or protected class group among the at least one second class group.

The adding of the integrity code may include adding a protected class including the integrity code and the protection code to the at least one second class group.

The file protection method may further include loading a first class group included in the package file after the regenerating, restoring an encrypted second class group included in the package file after the regenerating, and verifying an integrity of the first class group or the second class group using an integrity code included in the second class group to obtain a verification result.

The file protection method may further include terminating execution of the package file in response to determining the integrity of the first class group or of the second class group has been compromised based on the verification result.

According to an aspect of some example embodiments, there is provided a file protection method of a computer apparatus including at least one processor, the file protection method including loading, by the at least one processor, a first class group among a plurality of class groups to a memory, the plurality of class groups being included in a package file, the first class group including a first loading code, restoring, by the at least one processor, an encrypted second class group among the plurality of class groups on the memory using the first loading code, the second class group including a second loading code, designating, by the at least one processor, executable file information corresponding to the second class group to be recognizable by a class loader of the computer apparatus using the first loading code, restoring, by the at least one processor, an encrypted third class group among the plurality of class groups on the memory using the second loading code, and designating, by the at least one processor, executable file information corresponding to the third class group to be recognizable by the class loader of the computer apparatus using the second loading code.

The file protection method may further include verifying, by the at least one processor, an integrity of at least one class group among the first class group, the second class group, or the third class group, the verifying being performed using an integrity code included in at least one of the second class group or the third class group.

The file protection method may further include terminating execution of the package file in response to determining the integrity of the at least one class group has been compromised based on the verifying.

According to an aspect of some example embodiments, there is provided a non-transitory computer-readable record medium storing instructions that, when executed by the at least one processor, cause the at least one processor to perform the file protection method.

According to an aspect of some example embodiments, there is provided a computer apparatus including at least one processor configured to execute computer-readable instructions. The at least one processor is configured to extract a plurality of classes from an executable file of a package file, classify the plurality of classes into a plurality of class groups, add a loading code to at least one first class group among the plurality of class groups, the loading code configured to cause sequential loading of the plurality of class groups to a memory in a random loading order in response to execution of the package file, add an integrity code to at least one second class group among the plurality of class groups, the integrity code configured to verify an integrity of at least one of a corresponding class group among the plurality of class groups or a previous class group among the plurality of class groups, the previous class group including the loading code configured to cause the corresponding class group to load, and regenerate the package file using the plurality of class groups to which the loading code and the integrity code are added.

The at least one processor may be configured to load a first class group included in the package file after the package file is regenerated, restore an encrypted second class group included in the package file after the package file is regenerated, and verify an integrity of the first class group or the second class group using an integrity code included in the second class group to obtain a verification result.

The least one processor may be configured to terminate execution of the package file in response to determining the integrity of the first class group or of the second class group has been compromised based on the verification result.

According to some example embodiments, it is possible to generate a plurality of class groups by distributing classes of a source executable file included in a package file and to allow at least one class group among the plurality of class groups to verify integrity of a current class group and/or a class group having called the current class group while the plurality of class groups is sequentially loaded to a memory in random order at a point in time at which execution of the source executable file is requested, thereby preventing bypass of a protection code for the executable file or reducing the occurrence thereof.

Further areas of applicability will become apparent from the description provided herein. The description and specific examples in this summary are intended for purposes of illustration only and are not intended to limit the scope of the present disclosure.

DETAILED DESCRIPTION

Figure 1:
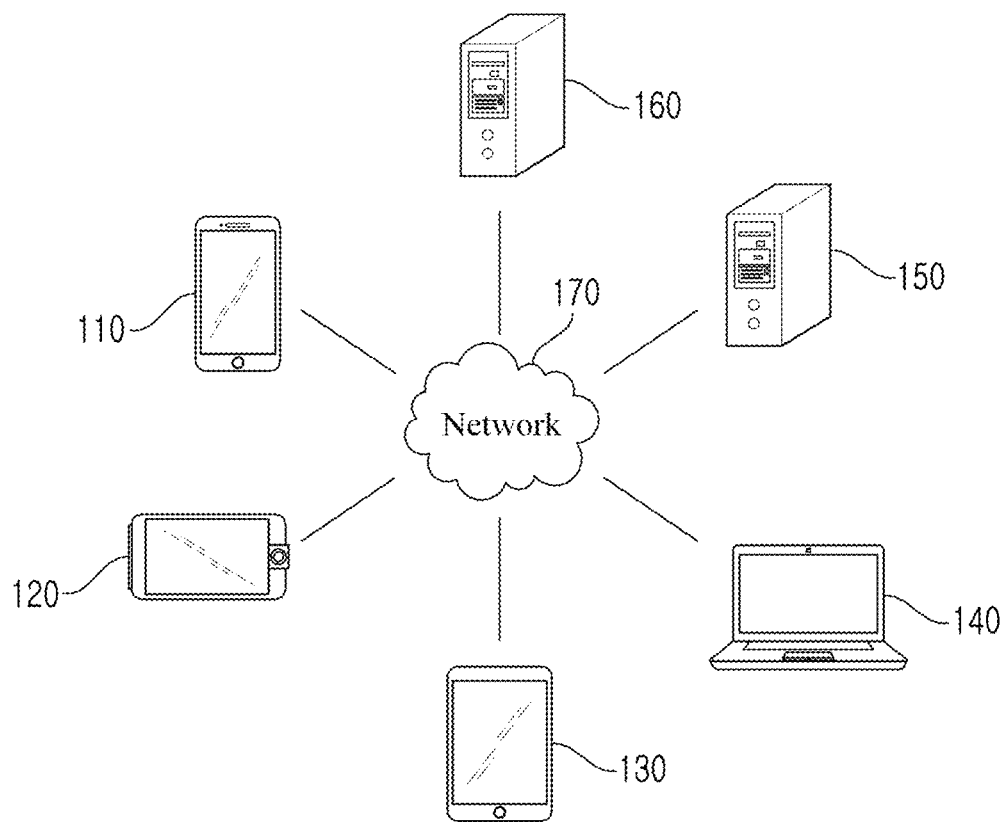
FIG. 1 is a diagram illustrating an example of a network environment according to some example embodiments.

Some example embodiments will be described in detail with reference to the accompanying drawings. Some example embodiments, however, may be embodied in various different forms, and should not be construed as being limited to only the illustrated examples. Rather, the illustrated examples are provided so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, operations, elements, and/or components, but do not preclude the presence or addition of one or more other features, integers, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as, or a similar meaning to, that commonly understood by one of ordinary skill in the art to which some example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned herein. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, some example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of some example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

A file protection system according to some example embodiments may be implemented by at least one computer apparatus and a file protection method according to some example embodiments may be performed through at least one computer apparatus included in the file protection system. A computer program may be installed and executed on the computer apparatus and the computer apparatus may perform the file protection method according to some example embodiments under control of the executed computer program. The aforementioned computer program may be stored in a non-transitory computer-readable record medium to computer-implement the file protection method in conjunction with the computer apparatus.

FIG. 1 illustrates an example of a network environment according to some example embodiments. Referring to FIG. 1, the network environment may include a plurality of electronic devices 110, 120, 130, and 140, a plurality of servers 150 and 160, and/or a network 170. FIG. 1 is provided as an example only. A number of electronic devices or a number of servers is not limited thereto. Also, the network environment of FIG. 1 is provided as an example of environments applicable to some example embodiments, and the environment applicable to some example embodiments is not limited to the network environment of FIG. 1.

Each of the plurality of electronic devices 110, 120, 130, and/or 140 may be a fixed terminal or a mobile terminal that is configured as a computer apparatus. For example, the plurality of electronic devices 110, 120, 130, and/or 140 may be a smartphone, a mobile phone, a navigation device, a computer, a laptop computer, a digital broadcasting terminal, a personal digital assistant (PDA), a portable multimedia player (PMP), a tablet personal computer (PC), and/or the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and/or the Internet. Also, the network 170 may include at least one of network topologies that include a bus network, a star network, a ring network, a mesh network, a star-bus network, a tree or hierarchical network, and/or the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and/or 140 over the network 170. For example, the server 150 may be a system that provides a service to the plurality of electronic devices 110, 120, 130, and/or 140 connected over the network 170. For example, the service may include a file distribution service, a map service, a content providing service, a group call service or a voice conference service, a messaging service, a mail service, a social network service, a translation service, a financial service, a payment service, and/or a search service.

Figure 2:
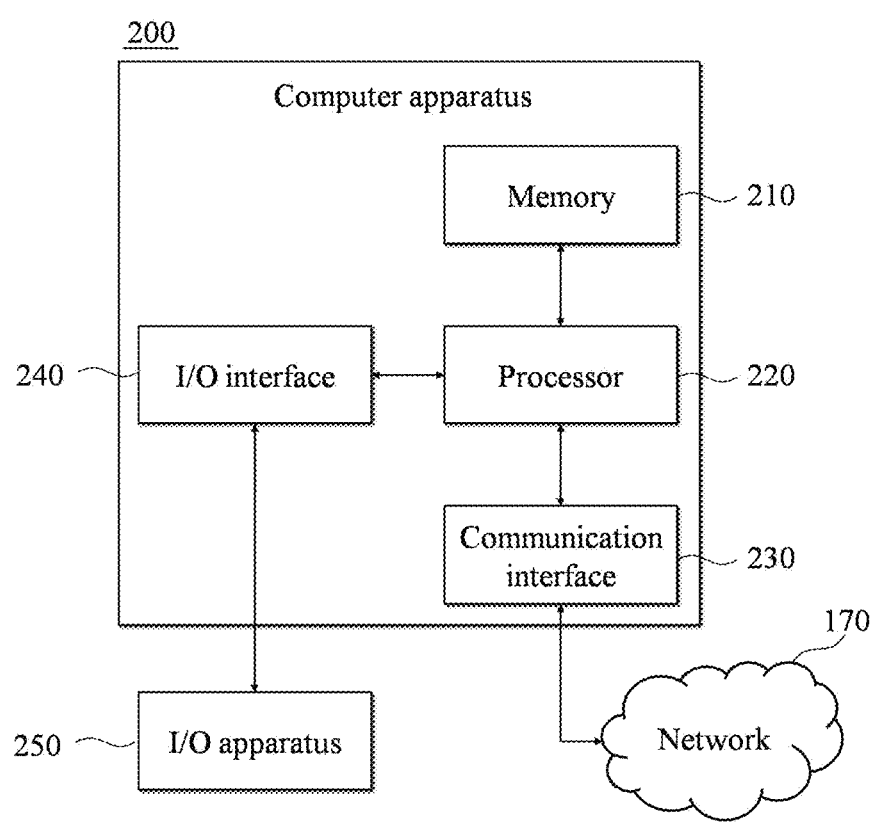
FIG. 2 is a diagram illustrating an example of a computer apparatus according to some example embodiments.

FIG. 2 is a block diagram illustrating an example of a computer apparatus according to some example embodiments. Each of the plurality of electronic devices 110, 120, 130, and 140, and/or the servers 150 and/or 160, may be implemented in a computer apparatus 200 of FIG. 2.

Referring to FIG. 2, the computer apparatus 200 may include a memory 210, a processor 220, a communication interface 230, and/or an input/output (I/O) interface 240. The memory 210 may include a permanent mass storage device, such as a random access memory (RAM), a read only memory (ROM), and/or a disk drive, as a non-transitory computer-readable record medium. The permanent mass storage device, such as the ROM and the disk drive, may be included in the computer apparatus 200 as a permanent storage device separate from the memory 210. Also, an OS and at least one program code may be stored in the memory 210. Such software components may be loaded to the memory 210 from another non-transitory computer-readable record medium separate from the memory 210. The other non-transitory computer-readable record medium may include a non-transitory computer-readable record medium, for example, a floppy drive, a disk, a tape, a DVD/CD-ROM drive, a memory card, etc. According to some example embodiments, software components may be loaded to the memory 210 through the communication interface 230, instead of the non-transitory computer-readable record medium. For example, the software components may be loaded to the memory 210 based on a computer program installed by files provided over the network 170.

The processor 220 may be configured to process instructions of a computer program by performing basic arithmetic operations, logic operations, and/or I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the computer apparatus 200 and other apparatuses, for example, the aforementioned storage devices, over the network 170. For example, the processor 220 of the computer apparatus 200 may transfer a request created based on a program code stored in the storage device such as the memory 210, to the other apparatuses over the network 170 under control of the communication interface 230. Inversely, a signal, an instruction, data, a file, etc., from another apparatus may be received at the computer apparatus 200 through the communication interface 230 of the computer apparatus 200. For example, a signal, an instruction, data, etc., received through the communication interface 230 may be transferred to the processor 220 or the memory 210, and a file, etc., may be stored in a storage medium, for example, the permanent storage device, further includable in the computer apparatus 200.

The I/O interface 240 may be a device used for interfacing with an I/O apparatus 250 (e.g., an input device and/or an output device). For example, an input device may include a device, such as a microphone, a keyboard, a mouse, etc., and an output device may include a device, such as a display, a speaker, etc. As another example, the I/O interface 240 may be a device for interfacing with an apparatus in which an input function and an output function are integrated into a single function, such as a touchscreen. The I/O apparatus 250 may be configured as a single device with the computer apparatus 200.

According to some example embodiments, the computer apparatus 200 may include a number of components greater than or less than a number of components shown in FIG. 2. However, some components according to the related art are not illustrated in detail. For example, the computer apparatus 200 may include at least a portion of the I/O apparatus 250, or may further include other components, for example, a transceiver, a database (DB), and/or the like.

Figure 3:
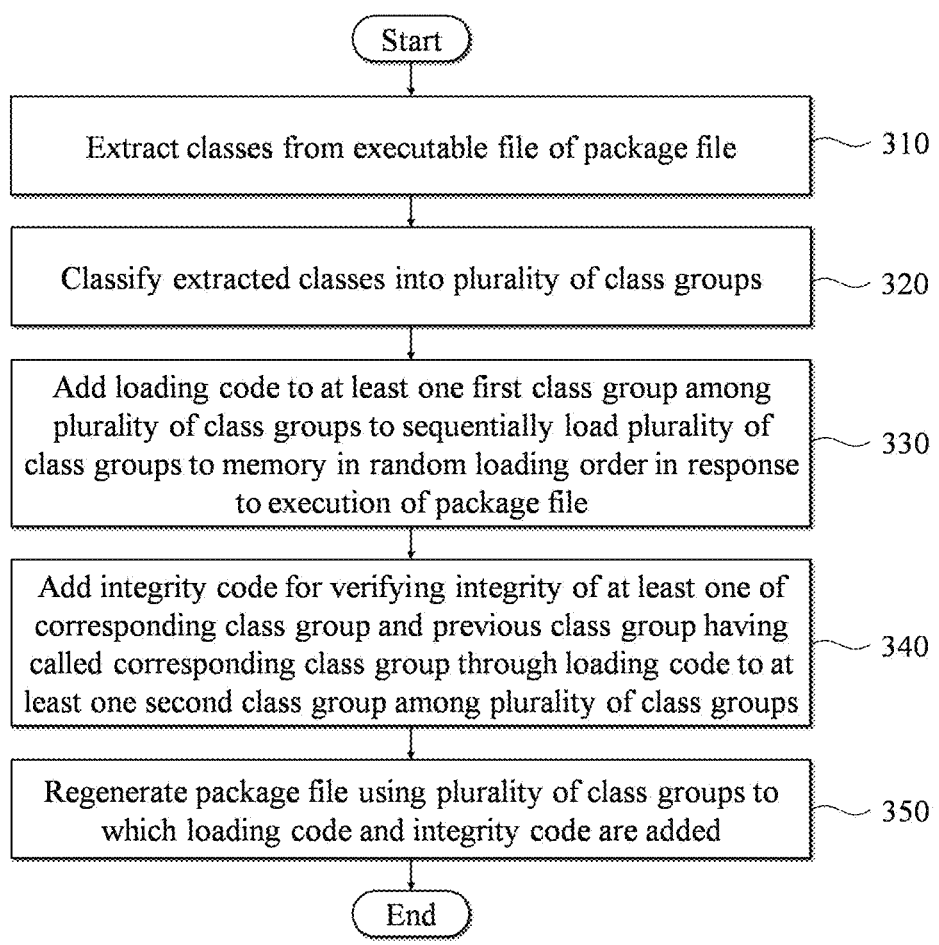
FIG. 3 is a flowchart illustrating an example of a file protection method according to some example embodiments.

FIG. 3 is a flowchart illustrating an example of a file protection method according to some example embodiments. The file protection method of FIG. 3 may be performed by the computer apparatus 200 that implements a system of an entity, for example, a distributor of an application, that desires to provide a package file to users. Here, the processor 220 of the computer apparatus 200 may be configured to execute a control instruction according to a code of at least one computer program, and/or a code of an OS, included in the memory 210. Here, the processor 220 may control the computer apparatus 200 to perform operations 310 to 350 included in the file protection method of FIG. 3 in response to the control instruction provided from a code stored in the computer apparatus 200.

Referring to FIG. 3, in operation 310, the computer apparatus 200 may extract classes from an executable file of a package file. For example, the package file may include (e.g., may be) an Android application package (APK) file in an Android operating system (OS) environment, the executable file may include (e.g., may be) a dex file (e.g., a Dalvik executable file), and the class may include (e.g., may be) a JAVA class. However, this is provided as an example only.

In operation 320, the computer apparatus 200 may classify the extracted classes into a plurality of class groups. For example, the computer apparatus 200 may designate each of the extracted classes as a protected class or a non-protected class, and may classify the extracted classes into a class group for the protected class and/or a class group for the non-protected class. Depending on some example embodiments, the computer apparatus 200 may further classify the class group for the protected class into at least two class groups. For example, the computer apparatus 200 may further classify the class group for the protected class into at least two class groups by separating an inner class within a respective protected class into a separate class group and/or by separating an anonymous class within a respective protected class into a separate class group. As another example, the computer apparatus 200 may classify lower classes included in a specific package unit in random order. For example, when developing a package file, the computer apparatus 200 may group interrelated classes into a specific package unit, and may maintain and develop related codes in the grouped specific package unit. In this case, if classes in the specific package unit are distributed, related logics may be further securely protected.

Classes of the executable file may be classified into a single non-protected class group and/or at least one protected class group. Also, the computer apparatus 200 may encrypt the protected class or the class group of the protected class.

In operation 330, the computer apparatus 200 may add a loading code to at least one first class group among the plurality of class groups to sequentially load the plurality of class groups to a memory in random loading order in response to execution of the package file. Here, the first class group may be remaining class groups excluding a last class group to be loaded among the plurality of class groups.

With regards to operation 330, the memory may refer to a memory included in a physical apparatus in which the package file is executed. The aforementioned physical apparatus may be the computer apparatus 200 according to some example embodiments, and/or may be a separate apparatus configured to install and execute the package file distributed by the computer apparatus 200.

Here, the computer apparatus 200 may set the loading order (e.g., the random loading order) for the classified plurality of groups (e.g., the plurality of class groups) and may add the loading code to the first class group such that, when the package file is executed, the plurality of groups may be sequentially loaded to the memory in such a loading order. For example, when the package file is executed, an executable file including a class group 1 for the non-protected class may be initially loaded to the memory and a class group 2 in subsequent order may be loaded to the memory based on the loading code added to the loaded class group 1. The class group 2 in subsequent order may load a class group 3 in subsequent order to the memory. Such sequential loading of class groups may be repeated until all class groups are loaded on the memory. Since there is no class file to be additionally loaded in the case of a last class file, the class file in last order may not include a separate loading code.

Here, since the protected class or the class group for the protected class is encrypted, the loading code may include a code used to restore a subsequent encrypted class group and load the same on the memory.

Also, the computer apparatus 200 may add the loading code to a static initialization function of a particular class included in the first class group.

In operation 340, the computer apparatus 200 may add an integrity code for verifying the integrity of at least one of a corresponding class group and/or a previous class group, having called the corresponding class group through the loading code, to at least one second class group among the plurality of class groups. For example, an integrity code for verifying the integrity of at least one of the class group 3 and/or the class group 2, that is a previous class group having called the class group 3, may be added to the class group 3.

In operation 340, according to some example embodiments, the computer apparatus 200 may add, to the second class group, an integrity verification code for determining (e.g., detecting, identifying, indicating, etc.) a modification of a class group that includes an integrity detection code based on the integrity detection code that is modified in the case of regenerating the package file and modification of the integrity detection code. Here, the integrity detection code may include at least one of a function of which bytecode is modified to be abnormally terminated and/or a function of which bytecode is modified to use a registry size beyond an available range, and/or may include a separate class that is not actually called. If the integrity is compromised, the integrity detection code may be abnormally terminated by performing the aforementioned class and/or may operate to prevent an abnormal operation from being performed by using a registry size beyond the available range (or reduce the occurrence of the abnormal operation). However, this is provided as an example only. It is possible to modify any types of bytecodes to prevent an executable code from normally operating when the integrity is compromised (or reduce the occurrence of such operation). According to some example embodiments, the integrity detection code may include a function having a bytecode configured to cause the executable code of the package file to be abnormally terminated when integrity is compromised, a function having a bytecode configured to cause the executable code of the package file to use a registry size beyond an available range (e.g., to prevent or limit normal operation when integrity is compromised), or a separate class that is not called by the executable code of the package file (that may be called and used to abnormally terminate the executable code when integrity is compromised).

According to some example embodiments, an integrity verification code included in the class group 3 may determine a modification of the class group 2 and/or the class group 3 based on an integrity detection code included in the class group 2 and/or the class group 3. According to some example embodiments, in operation 340, the computer apparatus 200 may control another computer apparatus configured to install and execute the package file to access integrity information about the second class group present in an external system and may add, to the second class group, an integrity verification code for determining modification of the corresponding second class group based on the integrity information. The term "computer apparatus" used herein may represent a physical apparatus of a side (e.g., an entity) that installs and executes the package file, which differs from the computer apparatus 200 of some example embodiments.

Depending on some example embodiments, the computer apparatus 200 may further add a protection code to the second class group. For example, the computer apparatus 200 may add a code for performing at least one of an operation of an anti-disassembler, an operation of an anti-decompiler, and/or an operation of an anti-debugger to a respective function or class included in the protected class, or the class group of the protected class, as the protection code.

Here, depending on some example embodiments, the computer apparatus 200 may add a protected class including the integrity code and the protection code to the second class group. That is, the integrity verification code included in the integrity code and the aforementioned protection code may be included in a single protected class, and the protected class may be added to the second class group. Depending on some example embodiments, the integrity verification code or a call code that class the integrity verification code in the protected class may be added to a particular class. For example, the computer apparatus 200 may add the integrity verification code or the call code of the integrity verification code to a non-protected class. As another example, the computer apparatus 200 may add the integrity verification code or the call code of the integrity verification code to a class of each of the classified class groups or a class of each of a portion of the classified class groups. Here, the integrity verification code or the call code of the integrity verification code may be added to a static initialization function of a corresponding class.

In the case of the protection code of the protected class added to the second class group, the same code (or similar codes) may apply for each protected class or different codes may apply for at least two protected classes. Also, a different code may apply for each protected class.

In operation 350, the computer apparatus 200 may regenerate the package file using a plurality of class groups to which the loading code and the integrity code are added. The regenerated package file may be distributed to computer apparatuses that may install and execute the corresponding package file. In the case of executing the package file in each corresponding computer apparatus, class groups may be sequentially loaded to a memory of the corresponding computer apparatus in random order based on the loading code. Also, since the integrity of a corresponding class group and a previous class group having called the corresponding class group is verified using the integrity code, it is possible to prevent users from bypassing the protection code or reduce the occurrence thereof.

Figure 4:
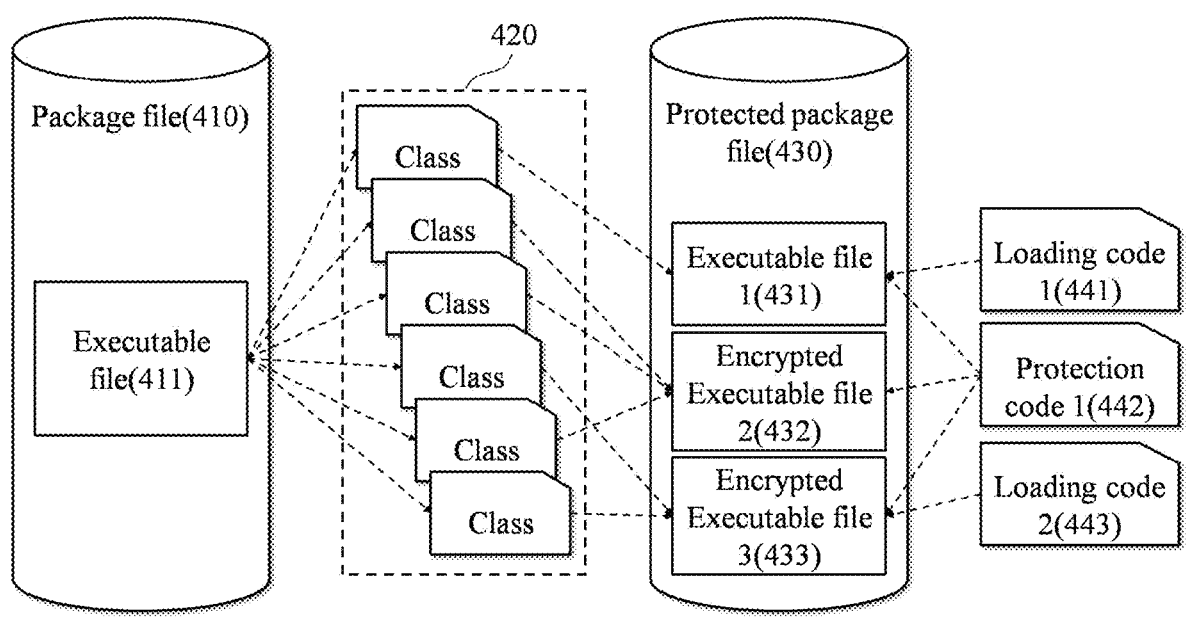
FIG. 4 illustrates an example of a process of regenerating a package file according to some example embodiments.

FIG. 4 illustrates an example of a process of regenerating a package file according to some example embodiments. FIG. 4 illustrates an example in which a plurality of classes 420 is extracted from an executable file 411 included in a package file 410. The extracted plurality of classes 420 may be classified into a plurality of class groups and at least a portion of the class groups may be encrypted. Here, the encrypted class groups may be class groups for a protected class. For example, referring to FIG. 4, the class groups may include separate executable files, for example, an executable file 1 431, an encrypted executable file 2 432, and an encrypted executable file 3 433. According to some example embodiments, the executable file 1 431, the encrypted executable file 2 432, and the encrypted executable file 3 433 may be included in a protected package file 430. In the example of FIG. 4, a protection code 1 442 is added to each of the executable file 1 431, the encrypted executable file 2 432, and the encrypted executable file 3 433, a loading code 1 441 is added to the executable file 1 431, and a loading code 2 433 is added to the encrypted executable file 3 433. In some example embodiments, the protection code 1 442 may include a protection code and an integrity code, which are described above with reference to FIG. 3. In this case, the executable files may be loaded in order of the executable file 1 431, the encrypted executable file 3 433, and the encrypted executable file 2 432. For example, after the executable file 1 431 is loaded to a memory, the executable file 1 431 may restore the encrypted executable file 3 433 through the loading code 1 441 and may load the restored executable file 3 433 to the memory. Also, the encrypted executable file 3 433 may restore the encrypted executable file 2 432 through the loading code 2 442 and may load the restored executable file 2 432 to the memory.

Figure 5:
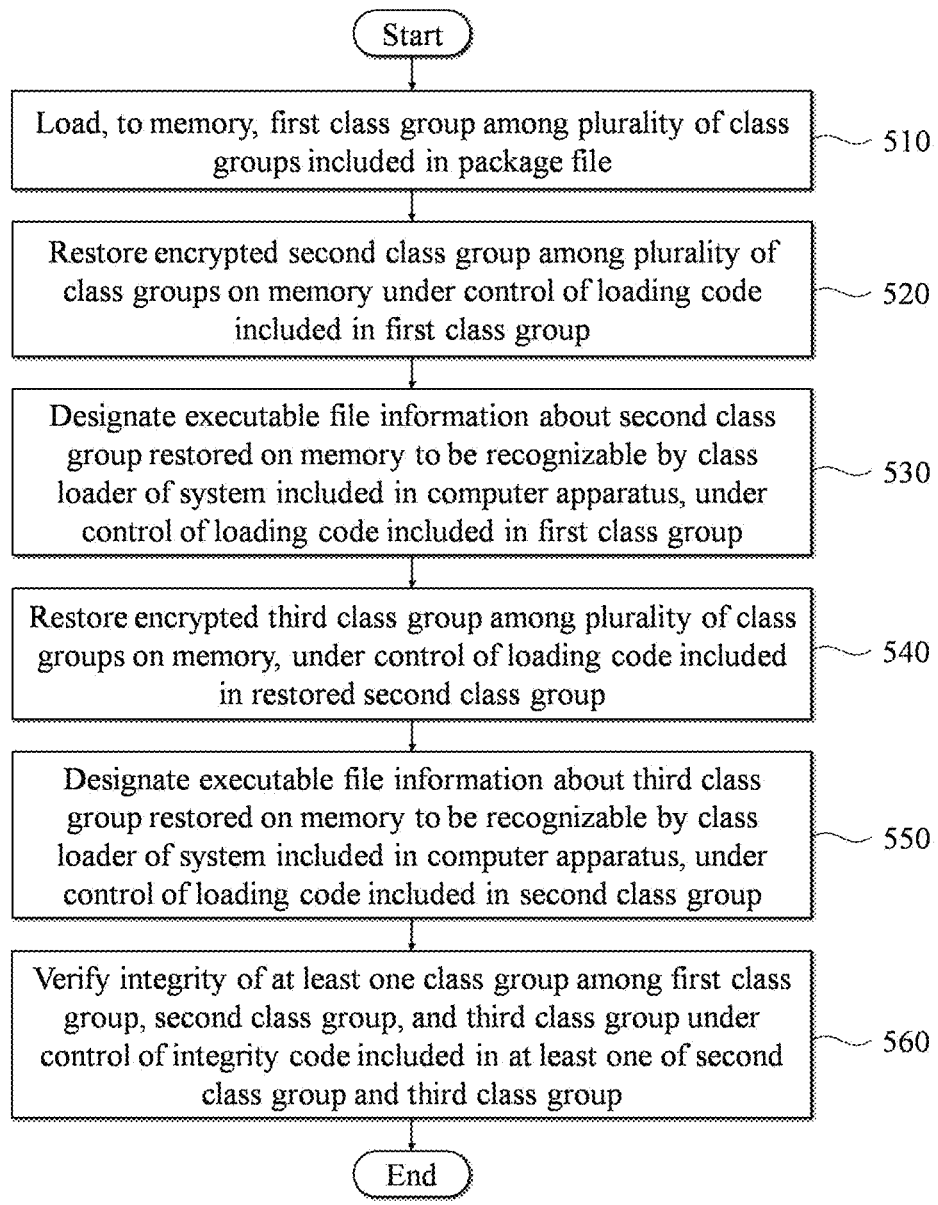
FIG. 5 is a flowchart illustrating another example of a file protection method according to some example embodiments.

FIG. 5 is a flowchart illustrating another example of a file protection method according to some example embodiments. The file protection method according to some example embodiments may be performed by the computer apparatus 200 that installs and executes a package file. Here, the processor 220 of the computer apparatus 200 may be configured to execute a control instruction according to a code of at least one computer program, and/or a code of an OS, included in the memory 210. Here, the processor 220 may control the computer apparatus 200 to perform operations 510 to 560 included in the method of FIG. 5 in response to the control instruction provided from the code stored in the computer apparatus 200.

Referring to FIG. 5, in operation 510, the computer apparatus 200 may load, to the memory 210, a first class group among a plurality of class groups included in a package file. For example, a class group for a non-protected class may be initially loaded to the memory 210.

In operation 520, the computer apparatus 200 may restore an encrypted second class group among the plurality of class groups on the memory 210 under control of a loading code included in the first class group. For example, when the loading code is executed in response to loading and executing the first class group to the memory 210, the computer apparatus 200 may restore the second class group and may load the restored second class group on the memory 210 under control of the loading code.

In operation 530, the computer apparatus 200 may designate executable file information about the second class group restored on the memory 210 to be recognizable by a class loader of a system included in the computer apparatus 200, under control of the loading code included in the first class group. That is, the computer apparatus 200 may designate executable file information about the second class group such that the class loader may recognize that the second class group loaded on the memory 210 is an executable file.

In operation 540, the computer apparatus 200 may restore an encrypted third class group among the plurality of class groups on the memory 210 under control of a loading code included in the restored second class group. For example, when the loading code is executed in response to loading and executing the second class group to the memory 210, the computer apparatus 200 may restore the third class group and may load the restored third class group on the memory 210 under control of the loading code.

In operation 550, the computer apparatus 200 may designate executable file information about the third class group restored on the memory 210 to be recognizable by the class loader of the system included in the computer apparatus 200, under control of a loading code included in the second class group.

As described above, the computer apparatus 200 may sequentially load, to the memory 210, all of class groups included in the package file in random order.

In operation 560, the computer apparatus 200 may verify the integrity of at least one class group among the first class group, the second class group, and/or the third class group, under control of an integrity code included in at least one of the second class group and/or the third class group. For example, a case in which the second class group includes an integrity code for verifying the integrity of the first class group and/or the second class group, or a case in which the third class group includes an integrity code for verifying integrity of the second class group and/or the third class group, may be considered. According to some example embodiments, the computer apparatus 200 may prevent, terminate and/or limit execution of a class, a class group and/or the package file, and/or generate an error report, in response to determining the integrity of the at least one class group has been compromised (e.g., based on a result of the verification in operation 560). According to some example embodiments, the computer apparatus 200 may normally execute the at least one class group and/or the package file in response to determining the integrity of the at least one class group has not been compromised (e.g., based on a result of the verification in operation 560).

As described above, although a user may acquire restored classes loaded on a memory by bypassing a protection code, each of the restored class groups may verify the integrity of a corresponding class group and/or a class group having called the corresponding class group, which may prevent a package file from being executed by bypassing a protection code or reduce the occurrence thereof.

Although it is possible to restore an encrypted file, store the restored encrypted file as a temporary file and then to load the restored temporary file to a memory, it is also possible to restore the encrypted file and immediately, or promptly, load the same on the memory through a function provided from an OS.

Figure 6:
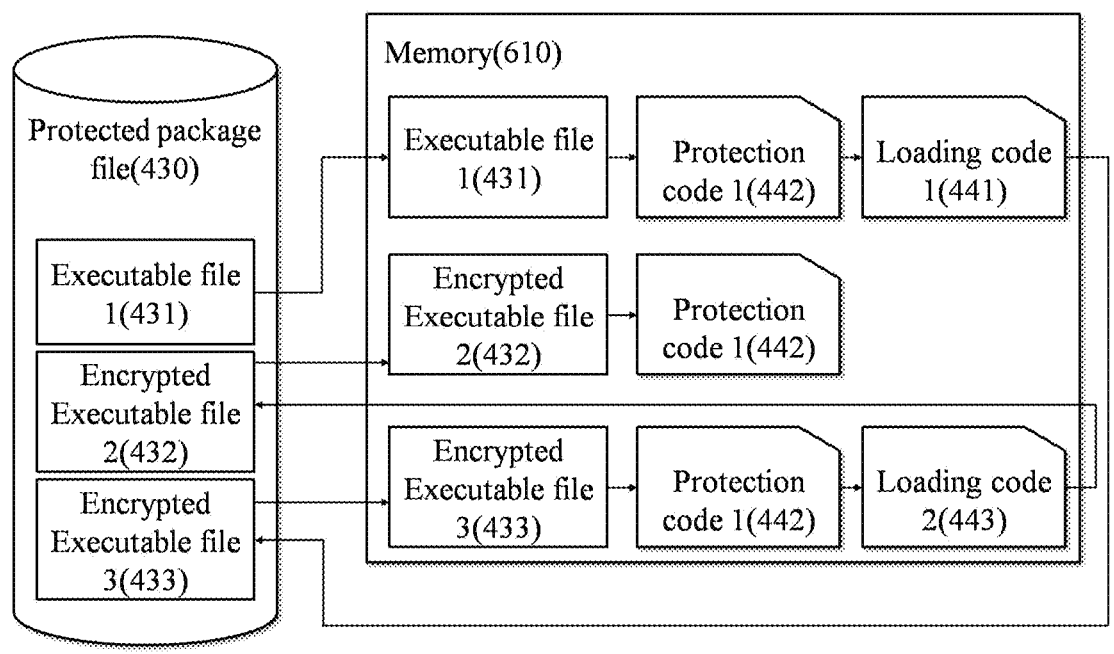
FIG. 6 is a diagram illustrating an example of a process of loading an executable code to a memory according to some example embodiments.

FIG. 6 illustrates an example of a process of loading an executable code to a memory according to some example embodiments. FIG. 6 illustrates a process of loading executable files, for example, the executable file 1 431, the encrypted executable file 2 432, and the encrypted executable file 3 433, to a memory 610 in response to execution of a protected package file 430 of FIG. 4. When the executable file 1 431 is initially loaded to the memory 610, the executable file 1 431 may be protected by the protection code 1 442, may restore the encrypted executable file 3 433 and may load the same to the memory 610 based on the loading code 1 441. Here, the encrypted executable file 3 433 may be protected by the protection code 1 442, may restore the encrypted executable file 2 432 and may load the same to the memory 610 based on the loading code 2 443. The encrypted executable file 2 432 may also be protected by the protection code 1 442. As described above, although a user may acquire restored classes loaded on a memory by bypassing a protection code, each of the restored class groups may verify the integrity of a corresponding class group and/or a class group having called the corresponding class group, which may prevent a package file from being executed by bypassing a protection code or reduce the occurrence thereof.

As described above, according to some example embodiments, it is possible to generate a plurality of class groups by distributing classes of a source executable file included in a package file, and to allow at least one class group among the plurality of class groups to verify the integrity of a current class group and/or a class group having called the current class group while the plurality of class groups is sequentially loaded to a memory in random order at a point in time at which execution of the source executable file is requested, thereby preventing bypass of a protection code for the executable file or reducing the occurrence thereof.

Conventional devices and systems for securing a package file, encrypt a portion of an executable file and provide a protection code for restoring the encrypted portion. Once the encrypted portion of the executable file is restored, the protection code is exposed, thereby providing opportunities to remove and replace (e.g., bypass) the protection code for the encrypted portion. Accordingly, the conventional devices and systems fail to adequately secure the package file.

However, according to some example embodiments, improved devices and systems are provided for securing a package file. For example, the improved devices and systems may sequentially load class groups of an executable file in a random order, and use an integrity code to verify the integrity of a current or previously called class group. Accordingly, the improved devices and systems overcome the deficiencies of the conventional devices and systems to prevent bypassing of a protection code, or reduce the occurrence thereof, thereby improving the security of the package file.

According to some example embodiments, operations described herein as being performed by each of the plurality of electronic devices 110, 120, 130, and 140, each of the plurality of servers 150 and 160, the computer apparatus 200, the processor 220 and/or the class loader may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. According to some example embodiments, operations described herein as being performed by the loading code, the integrity code, the integrity verification code, the integrity detection code and/or the protection code may be implemented using processing circuitry. According to some example embodiments, the loading code, the integrity code, the integrity verification code, the integrity detection code and/or the protection code may be implemented as encoded data used by processing circuitry to perform one or more operations described herein. According to some example embodiments, the loading code, the integrity code, the integrity verification code, the integrity detection code and/or the protection code may be implemented using structures and/or methods that would be understood to a person having ordinary skill in the art.

The systems or the apparatuses described above may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will appreciate that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The above-described methods according to some example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software. Examples of a program instruction may include a machine language code produced by a compiler and a high-language code executable by a computer using an interpreter.

While this disclosure includes some example embodiments, it will be apparent to one of ordinary skill in the art that various alterations and modifications in form and details may be made without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A file protection method of a computer apparatus including at least one processor, the file protection method comprising:
    extracting, by the at least one processor, a plurality of classes from an executable file of a package file;
    classifying, by the at least one processor, the plurality of classes into a plurality of class groups;
    adding, by the at least one processor, a loading code to at least one first class group among the plurality of class groups, the loading code configured to cause sequential loading of the plurality of class groups to a memory in a random loading order in response to execution of the package file;
    adding, by the at least one processor, an integrity code to at least one second class group among the plurality of class groups, the integrity code configured to verify an integrity of at least one of a corresponding class group among the plurality of class groups or a previous class group among the plurality of class groups, the previous class group including the loading code configured to cause the corresponding class group to load; and
    regenerating, by the at least one processor, the package file using the plurality of class groups after the adding the loading code and the adding the integrity code.

2. The file protection method of claim 1, wherein the classifying comprises:
    designating the plurality of classes as one or more protected classes and one or more non-protected classes;
    classifying each of the one or more protected classes into a protected class group among the plurality of class groups; and
    classifying each of the one or more non-protected classes into a non-protected class group among the plurality of class groups.

3. The file protection method of claim 2, wherein the classifying comprises classifying the protected class group into at least two protected class groups.

4. The file protection method of claim 2, wherein the classifying comprises encrypting the one or more protected classes or the protected class group.

5. The file protection method of claim 1, wherein the adding the loading code adds the loading code to a static initialization function of the at least one first class group.

6. The file protection method of claim 1, wherein the adding the integrity code comprises adding an integrity verification code to the at least one second class group, the integrity verification code configured to indicate whether an integrity detection code included in another class group has been modified.

7. The file protection method of claim 6, wherein the integrity detection code comprises at least one of:
    a function of which bytecode is modified to be abnormally terminated,
    a function of which bytecode is modified to use a registry size beyond an available range, or
    a separate class that is not called.

8. The file protection method of claim 1, wherein the adding the integrity code comprises controlling another computer apparatus to:
    access integrity information corresponding to the at least one second class group on an external system; and
    add an integrity verification code to the at least one second class group based on the integrity information, the other computer apparatus configured to install and execute the package file.

9. The file protection method of claim 1, wherein the adding the integrity code comprises adding a protection code to the at least one second class group.

10. The file protection method of claim 9, wherein
    the protection code comprises a code for performing at least one of an operation of an anti-disassembler, an operation of an anti-decompiler, or an operation of an anti-debugger; and
    the adding the protection code adds the protection code to a protected class or protected class group among the at least one second class group.

11. The file protection method of claim 9, wherein the adding the integrity code comprises adding a protected class including the integrity code and the protection code to the at least one second class group.

12. The file protection method of claim 1, further comprising:
    loading a first class group included in the package file after the regenerating;
    restoring an encrypted second class group included in the package file after the regenerating; and
    verifying an integrity of the first class group or the second class group using an integrity code included in the second class group to obtain a verification result.

13. The file protection method of claim 12, further comprising:
    terminating execution of the package file in response to determining the integrity of the first class group or of the second class group has been compromised based on the verification result.

14. A file protection method of a computer apparatus including at least one processor, the file protection method comprising:
    loading, by the at least one processor, a first class group among a plurality of class groups to a memory, the plurality of class groups being included in a package file, the first class group including a first loading code;
    restoring, by the at least one processor, an encrypted second class group among the plurality of class groups on the memory using the first loading code, the second class group including a second loading code;
    designating, by the at least one processor, executable file information corresponding to the second class group to be recognizable by a class loader of the computer apparatus using the first loading code;
    restoring, by the at least one processor, an encrypted third class group among the plurality of class groups on the memory using the second loading code; and
    designating, by the at least one processor, executable file information corresponding to the third class group to be recognizable by the class loader of the computer apparatus using the second loading code.

15. The file protection method of claim 14, further comprising:
 verifying, by the at least one processor, an integrity of at least one class group among the first class group, the second class group, or the third class group, the verifying being performed using an integrity code included in at least one of the second class group or the third class group.

16. The file protection method of claim 15, further comprising:
 terminating execution of the package file in response to determining the integrity of the at least one class group has been compromised based on the verifying.

17. A computer apparatus comprising:
 processing circuitry configured to cause the computer apparatus to,
  extract a plurality of classes from an executable file of a package file,
  classify the plurality of classes into a plurality of class groups,
  add a loading code to at least one first class group among the plurality of class groups, the loading code configured to cause sequential loading of the plurality of class groups to a memory in a random loading order in response to execution of the package file,
  add an integrity code to at least one second class group among the plurality of class groups, the integrity code configured to verify an integrity of at least one of a corresponding class group among the plurality of class groups or a previous class group among the plurality of class groups, the previous class group including the loading code configured to cause the corresponding class group to load, and
  regenerate the package file using the plurality of class groups to which the loading code and the integrity code are added.

18. The computer apparatus of claim 17, wherein the processing circuitry is configured to cause the computer apparatus to:
 load a first class group included in the package file after the package file is regenerated;
 restore an encrypted second class group included in the package file after the package file is regenerated; and
 verify an integrity of the first class group or the second class group using an integrity code included in the second class group to obtain a verification result.

19. The computer apparatus of claim 18, wherein the processing circuitry is configured to cause the computer apparatus to:
 terminate execution of the package file in response to determining the integrity of the first class group or of the second class group has been compromised based on the verification result.

* * * * *